(12) United States Patent
Ogawa et al.

(10) Patent No.: US 6,698,763 B2
(45) Date of Patent: Mar. 2, 2004

(54) PISTON RING

(75) Inventors: Katsuaki Ogawa, Saitama (JP); Minako Chinou, Saitama (JP)

(73) Assignee: Nippon Piston Ring Co., Ltd., Saitama (JP)

( * ) Notice: Subject to any disclaimer, the term of this patent is extended or adjusted under 35 U.S.C. 154(b) by 0 days.

(21) Appl. No.: 10/066,690

(22) Filed: Feb. 6, 2002

(65) Prior Publication Data

US 2002/0117808 A1 Aug. 29, 2002

(30) Foreign Application Priority Data

Feb. 27, 2001 (JP) ........................................ 2001-051581

(51) Int. Cl.[7] .................................................. F16J 9/00
(52) U.S. Cl. ........................ 277/434; 277/440; 277/441; 277/442; 277/443
(58) Field of Search ................................ 277/434, 440, 277/441, 442, 443, 444

(56) References Cited

U.S. PATENT DOCUMENTS

| | | | | |
|---|---|---|---|---|
| 4,106,782 A | * | 8/1978 | Hyde et al. | 277/444 |
| 5,316,321 A | * | 5/1994 | Ishida et al. | 277/443 |
| 5,582,414 A | * | 12/1996 | Miyazaki et al. | 277/444 |
| 5,960,762 A | * | 10/1999 | Imai | 123/193.4 |
| 6,209,881 B1 | * | 4/2001 | Michel et al. | 277/440 |
| 6,279,913 B1 | * | 8/2001 | Iwashita et al. | 277/442 |
| 6,325,385 B1 | * | 12/2001 | Iwashita et al. | 277/442 |
| 6,508,473 B1 | * | 1/2003 | Tanaka et al. | 277/440 |

FOREIGN PATENT DOCUMENTS

JP   3090520 B2   7/2000

* cited by examiner

Primary Examiner—Anthony Knight
Assistant Examiner—E Peavey
(74) Attorney, Agent, or Firm—Birch, Stewart, Kolasch & Birch, LLP

(57) ABSTRACT

A piston ring having a stainless steel base material, the base material having an upper surface, a lower surface, an inner circumferential surface and an outer circumferential surface, the surfaces each having a nitride layer formed thereon, the nitride layer each first being formed to have a compound layer and a diffusion layer, the diffusion layer of the outer circumferential surface then being exposed by removing the compound layer of the outer circumferential surface, the exposed diffusion layer thereafter having an ion-plating deposition layer of hard ceramic formed thereon, the piston ring wherein the exposed diffusion layer is entirely removed on the upper and lower corners of the upper and lower surface and the outer circumferential surface by chamfering corner regions of the nitride layer located around the upper and lower corners before the ion-plating deposition layer is formed.

10 Claims, 2 Drawing Sheets

PISTON RING

FIELD OF THE INVENTION

The present invention relates to a stainless steel piston ring having excellent abrasion resistance.

BACKGROUND OF THE INVENTION

Conventional stainless steel piston rings of excellent abrasion resistance are of the type in which the piston rings have a nitride layer formed on the upper and lower surfaces and the inner and outer circumferential surfaces of the stainless steel base material of the piston rings, by applying the nitriding process to those surfaces, where the diffusion layer of the nitride layer on the outer circumferential surface is then exposed by removing the compound layer of the nitride layer on the outer circumferential surface, and, thereafter, the exposed diffusion layer has an ion-plating deposition layer of hard ceramic formed thereon by vacuum vapor depositing a hard ceramic thereon. This type of piston ring had a disadvantage in that, when cracks occur in the ion-plating deposition layer, the cracks would propagate to the nitride layer, thereby resulting in a degradation of the fatigue strength.

In order to overcome this disadvantage, a piston ring is proposed in the Japanese Patent Publication No. 3,090,520 in which the piston ring has only an ion-plating deposition layer formed directed on the outer circumferential surface of the stainless steel base material thereof, and where the nitride layer is only formed on the upper and lower surfaces and the inner circumferential surface of the stainless steel base material.

The ion-plating deposition layer formed directly on the stainless steel base material however has a problem in that it is inferior in adhesion to an ion-plating deposition layer formed on the diffusion layer, of a nitride layer on the stainless steel base material, exposed by removing the compound layer of the nitride layer. Furthermore, another problem exists in that, in case an ion-plating deposition layer is formed directly on the outer circumferential surface of the stainless steel base material, the stainless steel base material tends to slide directly in contact with the surface of a cylinder or cylinder liner, that is otherwise supposed to slide in contact with the surface of the ion-plating deposition layer, as the ion-plating deposition layer wears out, thereby causing scuffing or scuff-marks, where countermeasures against it of increasing the deposition layer thickness would cause degradation of the breakage resistance, and, at the same time, lead to an increase in the manufacturing costs.

The present invention has been made to solve these problems. Therefore, an object of the present invention is to provide a piston ring of the type in which a nitride layer is formed on the upper and lower surfaces and the inner and outer circumferential surfaces of the stainless steel base material of a piston ring, where an ion-plating deposition layer of hard ceramic is formed on the nitride layer of the outer circumferential surface, wherein the piston ring has an advantage in that degradation of the fatigue strength would not be caused, even when cracks occur in the ion-plating deposition layer.

The present inventors have come to think of, and devise, the principle of the present invention by recognizing that, although cracks cannot be prevented from occurring in the ion-plating deposition layer on the outer circumferential surface of a piston ring because the ion-plating deposition layer is lacking in toughness, degradation of the fatigue strength of the piston ring caused by such cracks could be prevented by restraining the propagation of cracks occurring in the ion-plating deposition layer at the upper and lower corner regions of the upper and lower surfaces and the outer circumferential surface, because the cracks mainly occur at these corners.

SUMMARY OF THE INVENTION

In order to accomplish the object described above, a piston ring is provided, according to a first embodiment of the present invention, that is an improved piston ring of the type that has a stainless steel base material having an upper surface, a lower surface, an inner circumferential surface and an outer circumferential surface, the surfaces each having a nitride layer formed thereon. The exposed diffusion layer has thereafter an ion-plating deposition layer of hard ceramic formed thereon by vacuum vapor deposition. The piston ring, according to the first embodiment of the present invention is further processed, whereby the exposed diffusion layer is removed at the upper and lower corners of the upper and lower surfaces of the outer circumferential surface by chamfering the corner regions located at the upper and lower corners before the ion-plating deposition layer is formed.

According to a second embodiment of the present invention, a piston ring is provided wherein the exposed diffusion layer is reduced in the thickness to 30% or less of the nitride layer on at the upper and lower corners of the upper and lower surfaces and the outer circumferential surface by chamfering the corner regions located at the upper and lower corners before the ion-plating deposition layer is formed.

When a piston ring is produced as described above, according to the present invention, cracks tends to occur in the ion-plating deposition layer on the upper and lower corner regions of the stainless steel base material of the piston ring, as in conventional piston rings, because the ion-plating deposition layer is lacing in toughness. However, in the piston ring according to the present invention, even when cracks actually occur in the ion-plating deposition layer, such cracks would not propagate to areas below the deposition layer, because right under the ion-plating deposition layer, there exists a zone that would not allow cracks to propagate therethrough, that is, depending on the case, either the non-nitrided region of the stainless steel base material or an area located deepest in the diffusion layer that is little nitrided.

Specifically, in case that, according to the first embodiment of the present invention, the upper and lower corner regions of the nitride layer of the piston ring is chamfered deep enough to remove an entire nitride layer to expose the stainless steel base material on the upper and lower corner regions thereof, cracks occurring in the ion-plating deposition layer are definitely unlikely to propagate below because the non-nitrided stainless steel base material that would not allow cracks to propagate therethrough is located right under the ion-plating deposition layer.

However, in case where the axial length or thickness of the piston ring is relatively small, whereby deep chamfering could deteriorate the sealing capability of the piston ring, then, preferably, the corner chamfering process is conducted to the extent such that the exposed diffusion layer remains in thickness equal to 30% or less of the nitride layer in the original thickness thereof at the upper and lower corner regions of the outer circumferential surface, according to the second embodiment of the present invention.

In order to improve the crack preventive capability of the ion-plating deposition layer, the crystal state of the layer is preferably arranged so as to have a columnar structure with the crystal orientation at [200].

With a piston ring implemented as described above, an advantage is effected in that degradation of the fatigue strength is prevented that otherwise would be caused by cracks occurring in the ion-plating deposition layer of the piston ring.

DETAILED DESCRIPTION OF THE INVENTION

Referring to FIG. 1, an illustrative piston ring, according to the present invention, are described hereunder. FIG. 1 is cross-sectional views of a piston ring 1 according to a first embodiment of the present invention, where view (a) shows the piston ring 1 before chamfering, view (b) shows the piston ring 1 after chamfering, and view (c) shows the piston ring 1 after an ion-plating deposition layer 8 is formed.

Figure 1A:
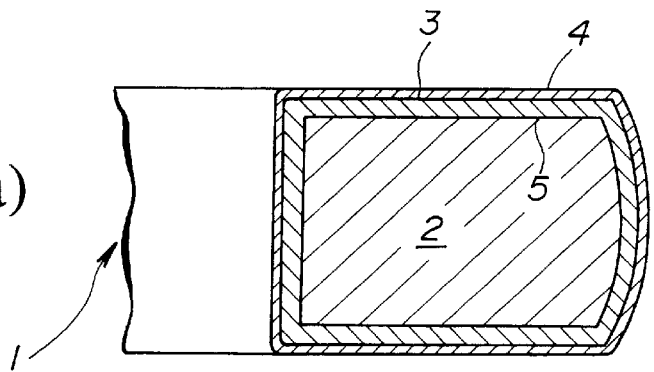
FIG. 1 is cross-sectional views of a piston ring according to a first embodiment of the present invention, wherein view (a) shows the piston ring before chamfering, view (b) shows the piston ring after chamfering, and view (c) shows the piston ring after an ion-plating deposition layer is formed.

As shown in FIG. 1(a), the piston ring 1 has a stainless steel base material 2 having an upper surface, a lower surface, an inner circumferential surface and an outer circumferential surface. All of the surfaces have a nitride layer 3 formed thereon, where the nitride layer 3 has a thickness of 60 to 120 $\mu$m. In the region of the surface and right under the surface of the nitride layer 3 is a compound layer 4 having a high nitrogen concentration, and a diffusion layer 5, where the nitrogen concentration is gradually reduced along the depth of the layer.

Figure 1B:
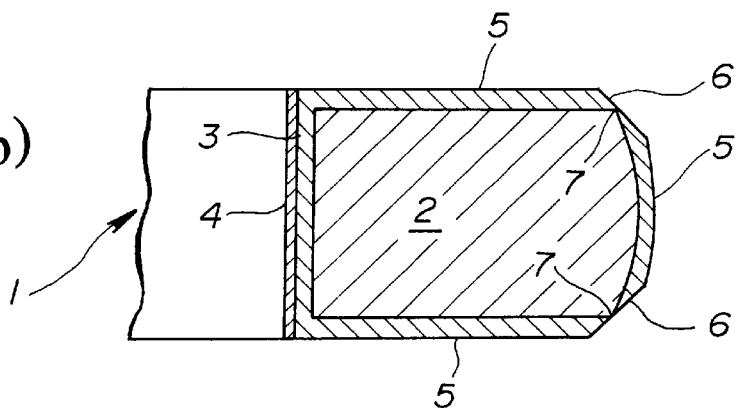

As shown in FIG. 1(b), the exposed diffusion layer 5 of the piston ring 1 is entirely removed on the upper and lower corners 7 of the upper and lower surfaces and the outer circumferential surface by chamfering the corner regions 6 located around the upper and lower corners of the outer circumferential surface by means of grinding. Thus, the nitride layer 3 is entirely removed, exposing the stainless steel base material 2 at the upper and lower corners 7. Before or after such chamfering, the compound layer 4 of the outer circumferential surface is also removed from the nitride layer 3 at the upper and lower surfaces and the outer circumferential surface of the piston ring 1, by grinding, thereby exposing the diffusion layer 5 of the nitride layer 3.

Figure 1C:
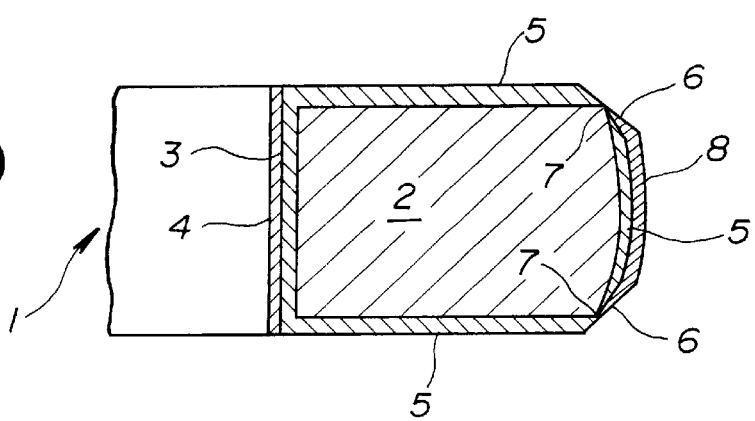

Then, as shown in FIG. 1(c), an ion-plating deposition layer 8 of hard ceramic is formed on the outer circumferential surface of the diffusion layer 5 of the piston ring 1 by means of vacuum vapor deposition. The thickness of the diffusion layer 5 located under the ion-plating deposition layer 8 is approximately constant except at the upper and lower corner regions 6 of the outer circumferential surface, where the thickness decreases the diffusion layer 5 approaches the upper and lower corners 7, and becomes zero at the upper and lower corners 7.

When this piston ring 1 arranged as above is used, cracks may occur in the ion-plating deposition layer 8 on the upper and lower corner regions 6 of the stainless steel base material 2 of the piston ring 1 because the ion-plating deposition layer 8 lacks toughness, and such cracks may act on the stainless steel base material 2 or the diffusion layer 5 near the upper and lower corners 7 thereof. However, because the stainless steel base material 2 is not affected by diffused nitrogen except the nitride layer 3, and because the regions of the diffusion layer 5 on and near the upper and lower corners 7 are located deepest in the nitrogen layer 3 where the diffused nitrogen concentration is relatively low and the effect of the diffused nitrogen is relatively little, cracks will not propagate to the stainless steel base material 2 or the diffusion layer 5. Therefore, cracks occurring in the ion-plating deposition layer 8 are unlikely to result in a degradation of the fatigue strength of the piston ring 1.

In the piston ring 1, according to the present invention, the ion-plating deposition layer 8 is formed on the diffusion layer 5, thereby providing better adhesion compared with the ion-plating deposition layer formed directly on the stainless steel base material. Thus, the ion-plating deposition layer 8, according to the present invention, is unlikely to peel off. Furthermore, even if the ion-plating deposition layer 8 disposed on the outer circumferential surface: wears out, scuffing does not occur because the diffusion layer 5 of the nitride layer 3 is located right under the ion-plating deposition layer 8.

While the compound layer 4 of the upper and lower surfaces has been removed after the nitriding process within the illustrated piston ring 1 described according to FIG. 1, such compound layer 3 of the upper and lower surfaces may be retained.

Next, referring to FIG. 2, another illustrative piston ring, according to the present invention, is described.

FIG. 2 represents cross-sectional views of a piston ring 1a, similar to FIG. 1 but according to a second embodiment of the present invention, wherein the axial length thereof is relatively small compared with the radial length of the piston ring of FIG. 1, where view (a) shows the piston ring 1a after chamfering, and view (b) shows the piston ring 1a after an ion-plating deposition layer 8a is formed thereon.

Figure 2A:
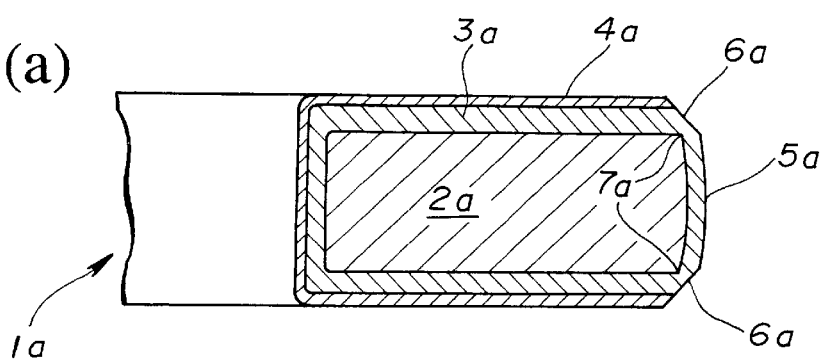
FIG. 2 is cross-sectional views of a piston ring, similar to FIG. 1 above but according to a second embodiment of the present invention wherein view (a) shows the piston ring after chamfering, and view (b) shows the piston ring after an ion-plating deposition layer is formed.

First, the piston ring 1a has a nitride layer 3a formed on all the surfaces of the stainless steel base material 2a, similar to the piston ring shown in Fig. 1(a), where the nitride layer 3a has a thickness of 60 120 $\mu$m. As shown in Fig. 2(a), the compound layer 4a of the outer circumferential surface is removed for the nitride layer 3a of the outer circumferential surface of the piston ring 1a, to expose the diffusion layer 5a on the outer circumferential surface, similar to FIG. 1(b). The exposed diffusion layer 5a is reduced in the minimum thickness thereof to 30% or less of the nitride layer 3a in the thickness thereof at the upper and lower corners of the outer circumferential surface, for example, the diffusion layer 5a being 20 $\mu$m when the nitride layer 3a is 100 $\mu$m, by chamfering corner regions 6a located at the upper and lower corners 7a.

Figure 2B:
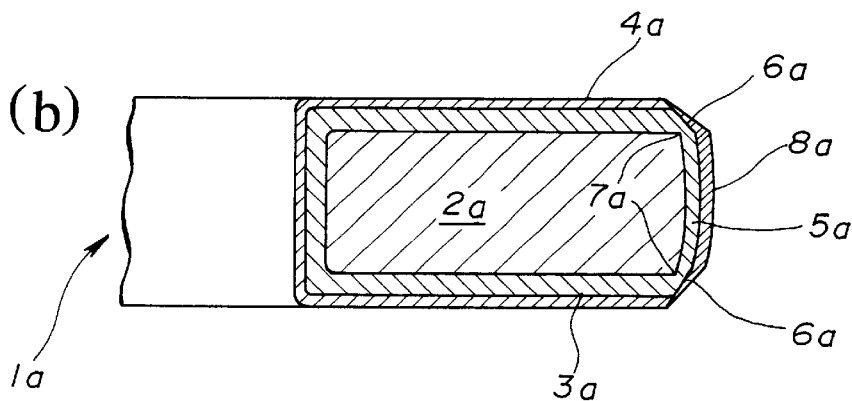

The, as shown in FIG. 2(b), an ion-plating deposition layer 8a of hard ceramic is then formed on the outer circumferential surface of the diffusion layer 5a of the piston ring 1a. Also, as shown in FIG. 2(b), the The thickness of the diffusion layer 5a located under the ion-plating deposition layer 8a is approximately constant except the upper and lower corner regions 6a of the outer circumferential surface, where the thickness gradually decrease 30% or less of the thickness of the nitride layer 3a near the upper and lower corners 7a.

When the piston ring 1a arranged as above is used, cracks may occur in the ion-plating deposition layer 8a at the upper and lower corner regions 6a near the upper and lower corners 7a of the stainless steel base material 2a of the piston ring 1a because the ion-plating deposition layer 8a is lacking in toughness, and such cracks may act on the diffusion layer 5a near the upper and lower corners 7a thereof. However, because the region of the diffusion layer 5a at and near the upper and lower corners 7a is located deepest in the nitrogen layer 3a where the diffused nitrogen concentration is relatively low, cracks do not propagate further. Therefore, the cracks occurring in the ion-plating deposition layer 8a is unlikely to result in degradation of the fatigue strength of the piston ring 1a. While the compound layer 3a of the upper and lower surfaces has been retained after the nitriding process with the illustrative piston ring 1a described according to FIG. 2, such compound layer 3a of the upper and lower surfaces may be removed, as described according to FIG. 1.

The arrangements and effect of the piston ring 1a, other than the description above, is similar to the piston ring 1 according to FIG. 1.

As described above, a piston ring arranged according to the present invention, has an excellent advantage in that the degradation of the fatigue strength of the piston ring is unlikely to result from cracks, first occurring in the ion-plating deposition layer, and otherwise further propagating to areas below the deposition layer, because, right under the ion-plating deposition layer, a zone is arranged to exist that would not allow cracks to propagate therethrough, where, depending on cases, the zone is either a non-nitrided region of the stainless steel base material or an area located deepest in the diffusion layer that is little nitrided.

The piston ring arranged according to the present invention, has another excellent advantage in that better adhesion is obtained compared with the ion-plating deposition layers formed directly on the stainless steel base material, as in the prior art, because the ion-plating deposition layer is formed on the diffusion layer, whereby the ion-plating deposition layer, according to the present invention, is unlikely to peel off.

Furthermore, the piston ring arranged according to the present invention, has another excellent advantage in that scuffing does not occur, even if the ion-plating deposition layer on the outer circumferential surface wears out, because the diffusion layer of the nitride layer is located right under the ion-plating deposition layer, thereby preventing the stainless steel base material of the piston ring from directly contacting the inner wall of the cylinder or cylinder liner where the piston ring is adapted to slide on.

What is claimed is:

1. A piston ring comprising:
    a stainless steel base material having an upper surface, a lower surface, an inner circumferential surface and an outer circumferential surface, said surfaces each having a nitride layer formed thereon, said nitride layer originally defining a compound layer and a diffusion layer, from which the compound layer was removed to expose the diffusion layer, the diffusion layer containing chamfered corner regions where the upper and lower corners of said upper and lower surfaces meet with said outer circumferential surface; and
    an ion-plating, hard ceramic deposition layer disposed on the diffusion layer.

2. The piston ring of claim 1, wherein, in the chamfered corner regions the diffusion layer is completely removed to expose the stainless steel base material, at its upper and lower corners.

3. The piston ring of claim 1, wherein in the chamfered corner regions the thickness of the diffusion layer is reduced to 30% or less.

4. The piston ring of claim 3, wherein the thickness of the diffusion layer disposed beneath the ion-plating deposition layer is substantially constant except at the chamfered corner regions.

5. The piston ring of claim 4, wherein the thickness of the diffusion layer disposed beneath the ion-plating deposition layer is substantially constant except at the chamfered corner regions.

6. The piston ring of claim 1, wherein the thickness of the diffusion layer disposed beneath the ion-plating deposition layer is substantially constant except at the chamfered corner regions.

7. A method of manufacturing a piston ring having a stainless steel base material, said base material having an upper surface, a lower surface, an inner circumferential surface and an outer circumferential surface, which comprises:
    forming a nitride layer containing a compound layer and a diffusion layer on said surfaces;
    removing the compound layer to expose the diffusion layer;
    chamfering the corner regions where the upper and lower corners of said upper and lower surfaces meet with said outer circumferential surface; and
    if ion-plating a hard ceramic deposition layer on the diffusion layer.

8. The piston ring of claim 7, wherein, in the chamfered corner regions the diffusion layer is completely removed to expose the stainless steel base material, at its upper and lower corners.

9. The piston ring of claim 7, wherein in the chamfered corner regions the thickness of the diffusion layer is reduced to 30% or less.

10. The piston ring of claim 7, wherein the thickness of the diffusion layer disposed beneath the ion-plating deposition layer is substantially constant except at the chamfered corner regions.

* * * * *